Dec. 26, 1939.     J. O. BOEHME                 2,184,904
                 FLOWER BED BORDER
            Filed May 12, 1939        3 Sheets-Sheet 1
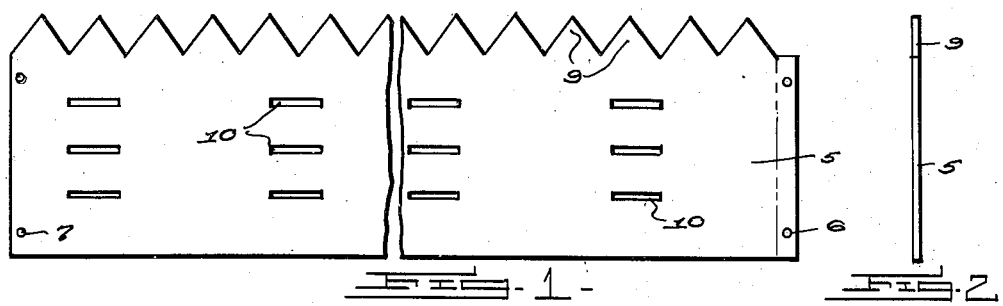
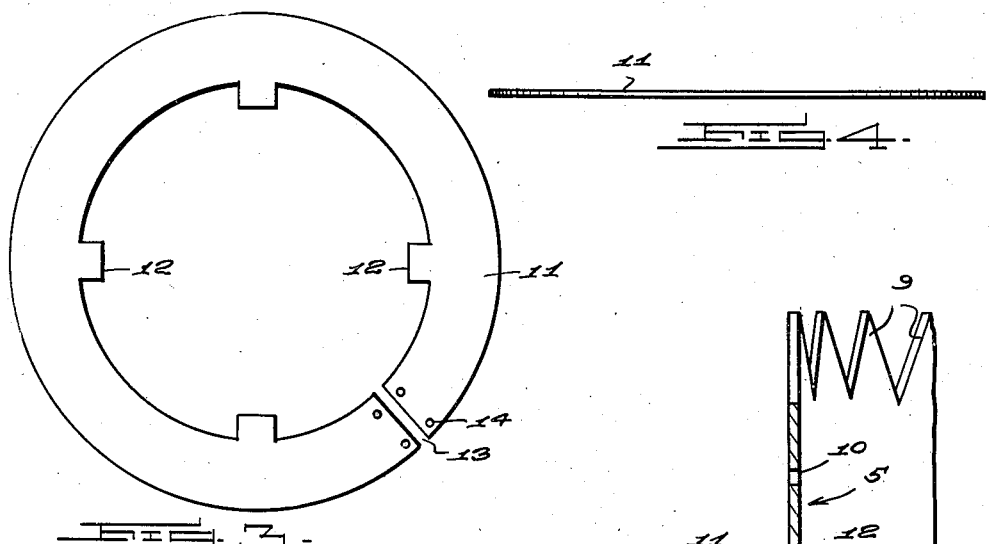
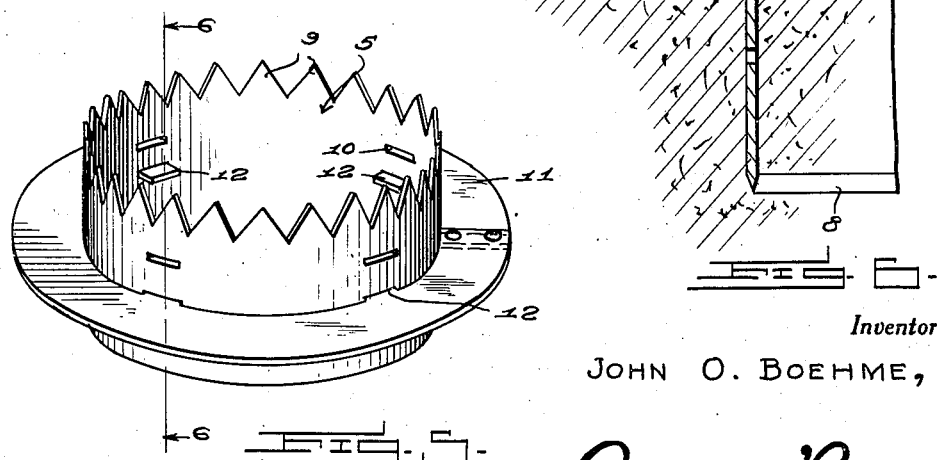
Inventor
JOHN O. BOEHME,
By *Clarence A. O'Brien and Hyman Berman*
Attorneys

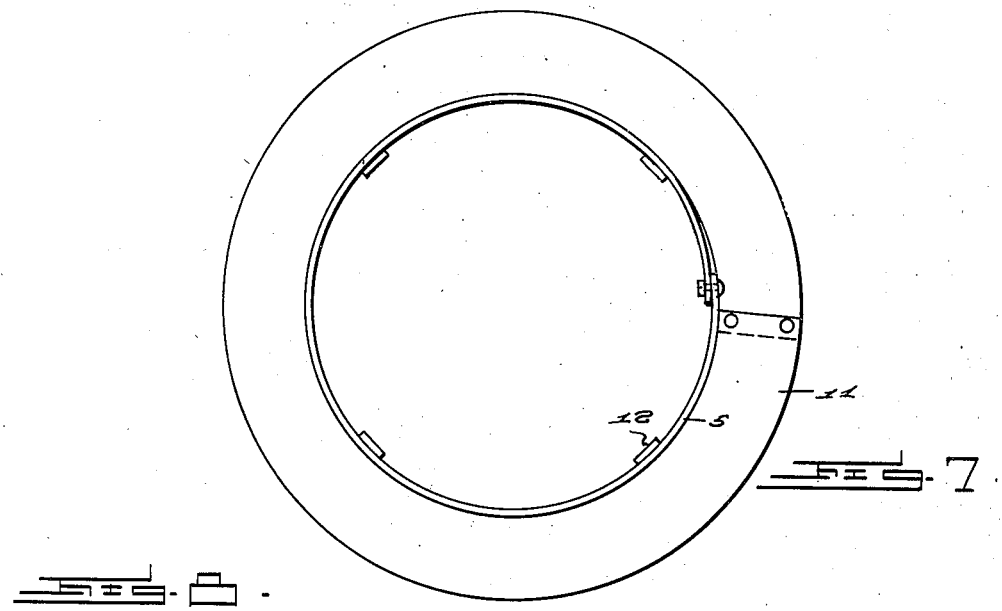
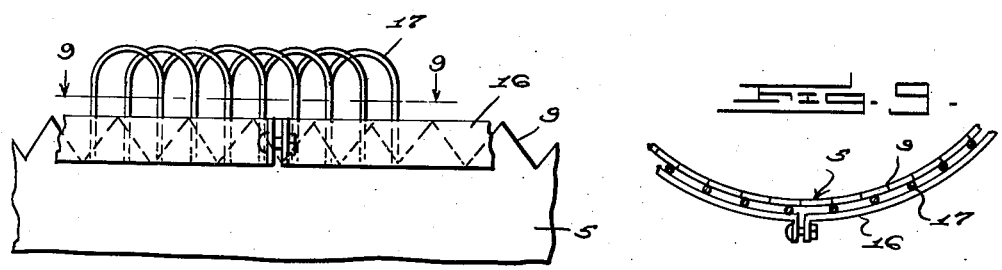
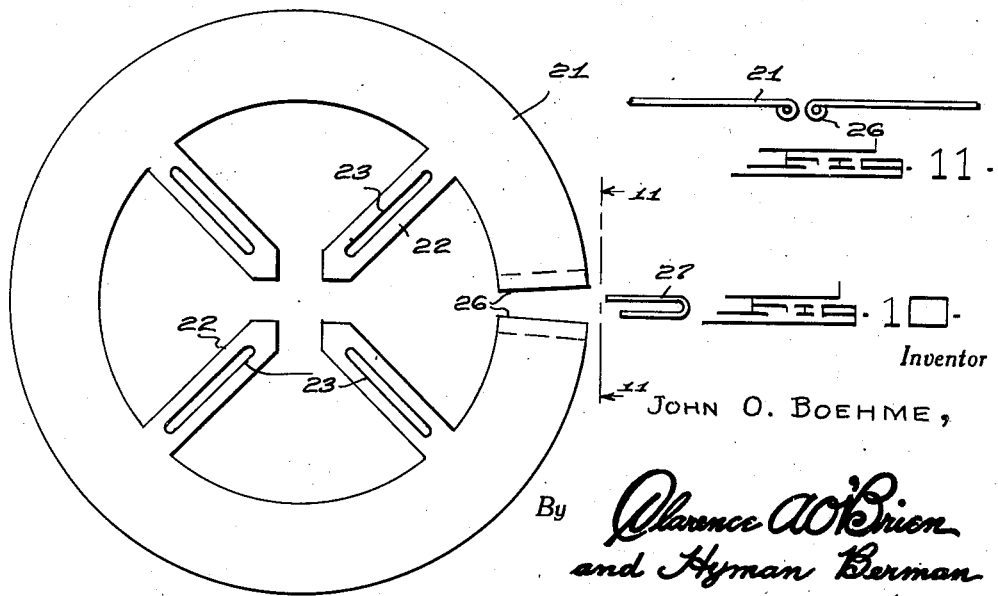

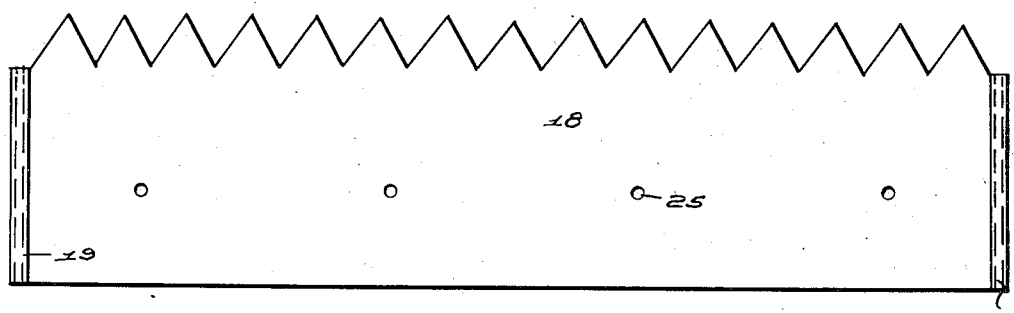
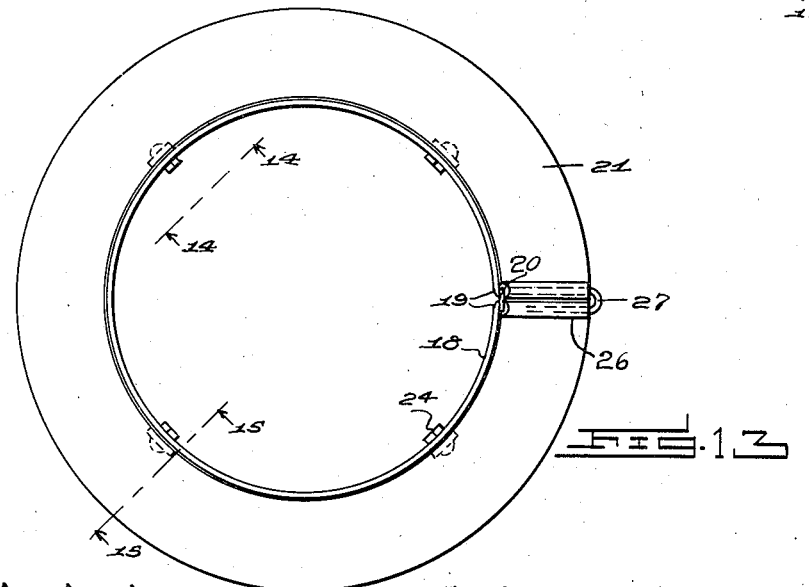
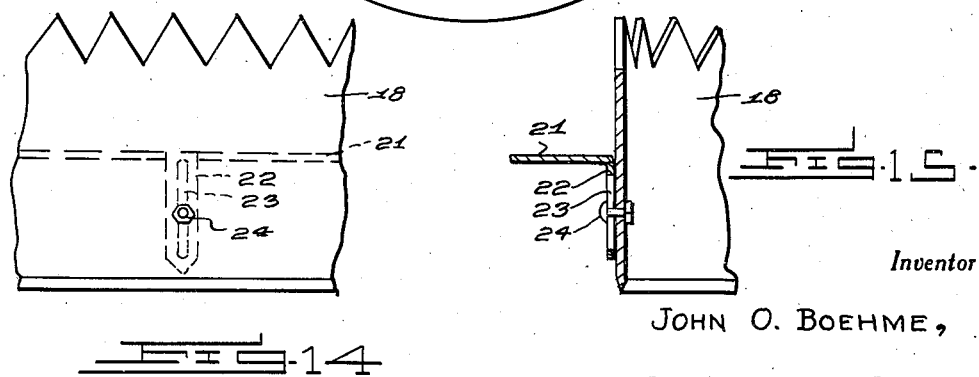
Inventor
JOHN O. BOEHME,
By Clarence A. O'Brien
and Hyman Berman
Attorneys Patented Dec. 26, 1939

2,184,904

UNITED STATES PATENT OFFICE 2,184,904

FLOWER BED BORDER

John O. Boehme, Washington, N. J.

Application May 12, 1939, Serial No. 273,343

2 Claims. (Cl. 47—33)

This invention relates to a flower bed border, and has for the primary object the provision of a device of this character which will render the care of a flower bed much easier and provides a neater and more attractive appearance thereto and further will guard the bed against trespassing of animals thereon and tend to prevent the growth of grass, weeds and undesirable growth in and adjacent the bed and its construction is such as to permit cutting of the grass close to the bed or the device by a lawn mower or similar device.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a plan view of an upstanding wall forming a part of the flower bed border device prior to being brought into an operative position.

Figure 2 is an end view illustrating said wall.

Figure 3 is a plan view illustrating a ground engaging flange of the border device.

Figure 4 is an edge view illustrating the flange.

Figure 5 is a perspective view of the guard wall and ground engaging flange assembled ready for use.

Figure 6 is a fragmentary vertical sectional view illustrating the device in use.

Figure 7 is a bottom plan view showing the assembled device.

Figure 8 is a fragmentary side elevation illustrating an attachment for the guard wall.

Figure 9 is a sectional view taken on the line 9—9 of Figure 8.

Figure 10 is a plan view illustrating a modified form of ground engaging flange.

Figure 11 is a detail view taken on the line 11—11 of Figure 10.

Figure 12 is a plan view illustrating a modified form of guard wall.

Figure 13 is a plan view illustrating the modified form of the present invention showing the ground engaging flange and guard wall assembled.

Figure 14 is a sectional view taken on the line 14—14 of Figure 13.

Figure 15 is a sectional view taken on the line 15—15 of Figure 13.

Referring in detail to the drawings, the numeral 5 indicates a protector or guard plate of elongated formation having one end bent upon itself for the reinforcement thereof and provided with bolt openings 6, the opposite end of said plate being provided with bolt openings 7 adapted to register with the bolt openings 6 when said plate is bent into cylindrical shape. Bolts or like fasteners are passed through the openings 6 and 7 for retaining the plate in cylindrical shape, as clearly shown in Figures 5 and 6. One edge of the plate is sharpened, as shown at 8, to facilitate the insertion of the plate into the ground to a selected depth, as shown in Figure 6. The opposite edge of the plate has formed therein a series of notches defining serrations or teeth 9 for the purpose of adding attractiveness to the plate and also to provide penetrating portions to coact with the plate in providing an efficient guard or protector against animals or the like.

The plate 5 when assembled in cylindrical shape as heretofore described and inserted in the ground is adapted to have the flower bed arranged therein so that the plate extends entirely about the flower bed to guard and protect the flowers of the bed. The plate 5 is provided with rows of slots 10. Either row of slots may be employed for mounting a ground flange 11 on the plate 5 by receiving tongues or tabs 12 formed on said flange. By having the rows of slots will permit the application of the ground flange to the plate 5 at various distances between the upper and lower edges of the plate 5 for the purpose of governing the depth of insertion of the plate 5 in the ground, it being understood that the flange 11 is to rest on the surface of the ground, as clearly shown in Figure 6, outwardly of the plate 5.

The flange 11 is of annular formation split, as shown at 13, to provide separable ends provided with openings 14 for the purpose of receiving bolts or like fasteners for joining the split ends of the flange together after the assembly thereof about the plate 5, as clearly shown in Figure 5. After the tongues have passed through the slots 10 they may be bent upwardly or downwardly for the purpose of clinching the tongues and thereby firmly anchoring the flange 11 on the plate 5.

After the plate 5 has been assembled in cylindrical shape and the flange 11 adapted thereto the plate is inserted in the ground taking therein a flower bed, as shown in Figure 6, with the flange 11 coming to rest on the surface of the ground which with the plate 5 will tend to retard the growth of grass in close proximity to the flower bed and which will permit the grass growing to the edge of the flange 11 to be readily cut with a lawn mower in the usual manner, the lawn mower passing readily over the flange 11 in order to cut the grass close thereto. The plate 5 standing a considerable distance above the surface of the ground about the flower bed will prevent animals and the like from entering the flower bed and provides thereto a neat and attractive appearance. It is to be understood that the plate 5 and flange have sufficient rigidity to maintain the desired shape. However, these parts may be readily flexed for assembling and disassembling purposes.

Referring to Figures 8 and 9 a split band is indicated by the character 16 and may be positioned about the plate 5 when the latter is in cylindrical form on its upper portion to take in the serrated upper edge as clearly shown in Figure 8 for clamping onto the plate 5 a plurality of U-shaped members 17 in overlapping relation which will give greater height to the plate 5 and provide a fence-like appearance thereto.

Referring to my modified form of the invention as shown in Figures 10 to 15, inclusive, the guard plate is indicated by the character 18 having the sharpened lower edge and the serrated upper edge, as clearly shown in Figure 12, and has its ends rolled upon itself to form barrel-like portions 19 which may be brought in close relation and joined together by a substantially U-shaped fastener 20, as shown in Figure 13.

The flange is indicated by the character 21 and has formed thereon a plurality of tongues 22 provided with slots 23. The tongues are adapted to be bent angularly to the flange 21 and brought in contact with the wall of the plate 18 after the latter has been bent into cylindrical shape, as shown in Figure 15. Bolts or like fasteners 24 extend through openings 25 in the plate 18 and through the slots whereby the flange is adjustably mounted on the plate 18 and may be moved upwardly and downwardly on the plate 18 when the latter is bent into cylindrical shape for the purpose of varying the distance of the insertion of the plate 18 in the ground about a flower bed.

The flange 21 is of the split type having its end portions rolled to form barrel-like portions 26 in which may be inserted a fastener of substantially U shape as shown at 27 for detachably connecting the ends of the flange together.

It is believed that the foregoing description, when taken in connection with the drawings will fully set forth the construction and advantages of this invention to those skilled in the art to which a device relates so that further detailed description will not be required.

What is claimed is:

1. A flower bed protecting device comprising a cylindrical member having detachably connected ends, means for connecting the ends, a split annular flange surrounding the cylindrical member, means for adjustably connecting the flange on the cylindrical member, means for detachably connecting the ends of the flange, a split band surrounding the cylindrical member adjacent its upper end, and a plurality of overlapping U-shaped members clamped on the cylindrical member by said band and projecting above the upper end of said cylindrical member.

2. A flower bed protecting device comprising a split cylindrical member having its ends rolled to form barrels, a substantially U-shaped fastener extending into the barrels for joining the ends of said cylindrical member, a split annular flange surrounding the cylindrical member and having its ends rolled to form barrels, a substantially U-shaped fastener extending into the latter-named barrels to join the ends of said flange, a plurality of elongated pointed arms formed on said flange and extending at right angles thereto and having slots, fasteners carried by the cylindrical member and extending through the slots for adjustably securing the flange on said cylindrical member, an adjustable securing means surrounding the cylindrical member above said flange, and a plurality of overlapping U-shaped members clamped on the cylindrical member by said adjustable securing means and projecting above the upper end of said cylindrical member.

JOHN O. BOEHME.